April 14, 1970 H. G. MEUNIER 3,505,856
METHODS OF MEASURING THE PERMEABILITY OF PARTICULATE MATERIAL
Filed Dec. 6, 1966
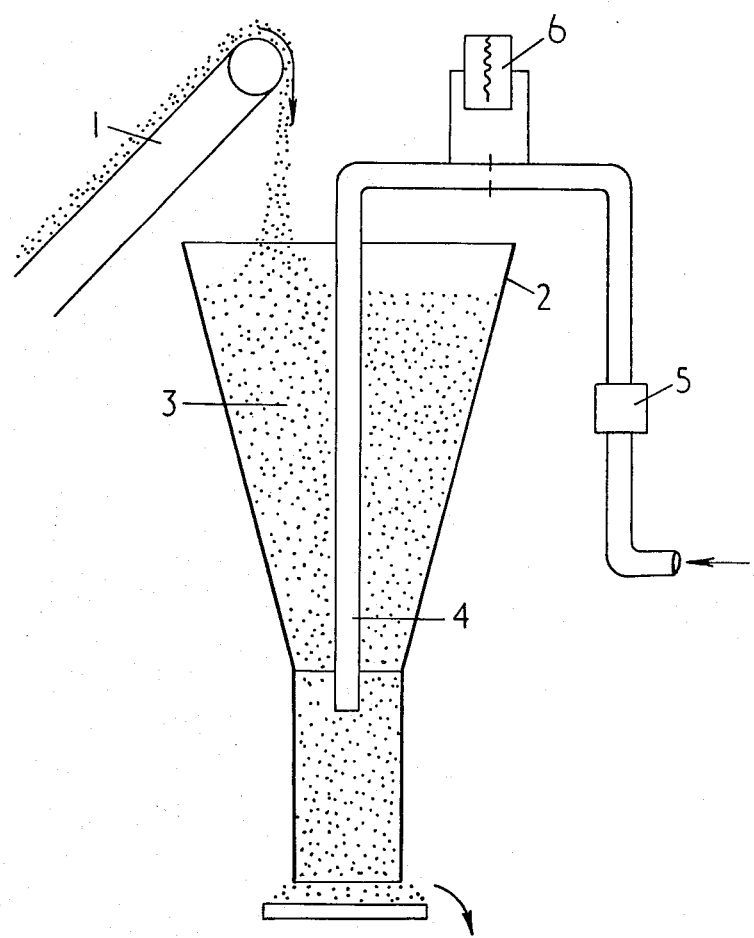
INVENTOR
HENRY GILBERT MEUNIER
ATTORNEYS

United States Patent Office 3,505,856
Patented Apr. 14, 1970

3,505,856
METHODS OF MEASURING THE PERMEABILITY OF PARTICULATE MATERIAL
Henry Gilbert Meunier, Liege, Belgium, assignor to Centre National de Recherches Metallurgiques, Brussels, Belgium, a Belgian company
Filed Dec. 6, 1966, Ser. No. 599,374
Claims priority, application Belgium, Dec. 7, 1965, 673,409; Jan. 7, 1966, 674,864; June 8, 1966, 682,293
Int. Cl. G01n *15/08*
U.S. Cl. 73—38
6 Claims

ABSTRACT OF THE DISCLOSURE

To measure the permeability of particulate materials as the material is passed through a container, air is blown through the container and material in the material flow direction at a rate of 20–100 $m.^3$ per hour through a tube having a diameter of from 40–100 mm. The outlet end of the tube is located at a distance from 100 to 600 mm. from the outlet end of the container. To determine the permeability of the particulate material, either the air is blown in at constant pressure and the flow rate is measured, or the flow rate is maintained constant and the pressure is measured.

---

The present invention concerns a method for measuring the permeability of particulate material, such as for instance an ore or a mixture of ores, and is of particular interest in the case where the said ore or mixture of ores is intended to be agglomerated.

A method is known of evaluating the permeability of a material in movement or of a mixture of materials in movement by measuring the flow characteristics of a fluid through one of the said materials under well defined operating conditions.

More particularly, the applicant has already recommended the method of deflecting continuously from their normal path a fraction of the said materials in movement. In the said method, the materials deflected in this way, pass by gravity continuously through a suitable device, from the top to the bottom, and a fluid is caused to pass through the said materials in transit in the said device, at a height the upper and lower levels of which are determined in such a way that on one hand the distance covered by the said fluid between these two levels is sufficient to permit a correct evaluation of the permeability of the said materials to be made, and on the other hand the column of materials occupying the portions of the device located above the upper level and below the lower level of the intermediate zone where the said fluid is circulating are adequate to permit accurate control of the fluid-tightness of the said intermediate zone, making it possible to obtain continuous, rapid and accurate recording of the permeability of the said materials after conversion of the measurements by means of suitable calculation.

The object of the present invention is a method based on the above-mentioned principles, by which it is possible to carry out measurements of permeability without having recourse to sampling techniques.

The accompanying drawing shows diagrammatically an apparatus for putting the method of the invention into operation. In the drawing, the feed device 1 supplied particulate solid material to the funnel 2. A blowing tube 4 is immersed in the material 3 in the funnel as shown and a device 5 for measuring flow rate of the air blown in and a device 6 for controlling the pressure of the air blown in are associated with the blowing tube 4. The pressure of the air blown in is controlled at a desired value and the flow rate of this air is measured by means of the device 5.

The essential features of the present invention is that during the passage of the material through a container such as for instance a feed funnel; air is blown at approximately the rate of 20 to 100 $m.^3$ per hour through the said material in the same direction as that of the flow of the material in the container, using a tube whose diameter is between approximately 40 mm. and 100 mm. and whose air outlet orifice is located at a distance of between 100 mm. and 600 mm. from the outlet end of the said container while; the filling level of the container is kept as constant as possible, the tolerance of the said level being a function of the height of the funnel; and the flow rate or the pressure of the blown-in air is measured as a representative factor of the permeability of the said material, depending on whether the blowing has been carried out respectively at constant pressure or at substantially constant air flow rate.

The filling level of the container is kept as constant as possible by using, for instance, known apparatus such as electronic balances, in order to ensure the stability of the conditions of permeability of the material in transit in the said container. Obviously the tolerance at the filling level is in relation to the total height of the container, in the sense that for a tall funnel one will be able to tolerate a greater fluctuation of the said level. The said filling level can be characterised by the vertical height of the column of material located, for instance, above the air orifice of the blowing-in tube. By way of example, but in no restrictive sense, it can be said that for a funnel of a total height of 1.25 m., the vertical height of the column of materials located above the air orifice of the blowing-in tube is advantageously 1 meter, the vertical distance separating the said orifice of the blowing-in tube and the outlet end of the funnel being 0.25 m. For larger funnels, variations of the filling level of ±20 centimeters can be tolerated.

By blowing-in air at the rate of approximately 20 to 100 $m.^3$ per hour by means of a tube whose diameter is between 40 mm. and 100 mm. it is possible to render the pressure drop in the tube negligible compared to the pressure drop in the material in movement, which increases the accuracy of the measurements and eliminates the necessity for adjusting the apparatus, which is always a slow and laborious process.

In the case where air is blown-in at substantially constant pressure, and where the rate of flow of the air is measured as characteristic factor of the air permeability of the material, it has been found to be advantageous to keep the pressure constant at ±1 mm. water column.

I claim:
1. A method for measuring the permeability of moving particulate solid materials comprising feeding said material through a container; blowing air through said material in said container at a rate of 20 to 100 $m.^3$ per hour in a direction the same as the direction of flow of said material by means of a tube having a diameter between 40 and 100 mm., the outlet end of which tube is located at a distance between 100 mm. and 600 mm. from the outlet end of said container; and measuring the flow rate of the air blown in at constant pressure, this flow rate being representative of the permeability of the said material.
2. A method as claimed in claim 1 in which the level of said material in said container is kept substantially constant.
3. A method as claimed in claim 1 wherein said container is a substantially vertical funnel, said feeding of said material is primarily by gravity through said funnel, and said air and material both exit at said outlet end of said funnel.

4. A method for measuring the permeability of moving particulate solid materials comprising feeding said material through a container; blowing air at a rate of approximately 20 to 100 m.$^3$ per hour through said material in said container in the same direction as the material flow by means of a tube, the diameter of which is between 40 and 100 mm. and the air outlet of which is located between 100 and 600 mm. from the outlet end of the said container; and measuring the pressure of the air, said air pressure being the factor representative of the permeability of said material when the rate of flow of said air is maintained substantially constant.

5. A method as claimed in claim 4 in which the level of said material in said container is kept substantially constant.

6. A method as claimed in claim 4 wherein said container is a substantially vertical funnel, said feeding of said material is primarily by gravity through said funnel, and said air and material both exit at said outlet end of said funnel.

References Cited

FOREIGN PATENTS 1,049,205  11/1966  Great Britain.
6,403,032   9/1964  Netherlands.

S. CLEMENT SWISHER, Primary Examiner

W. A. HENRY II, Assistant Examiner